E. O. SCHWEITZER.
MEASURING INSTRUMENT.
APPLICATION FILED FEB. 14, 1912.
1,087,189.
Patented Feb. 17, 1914.
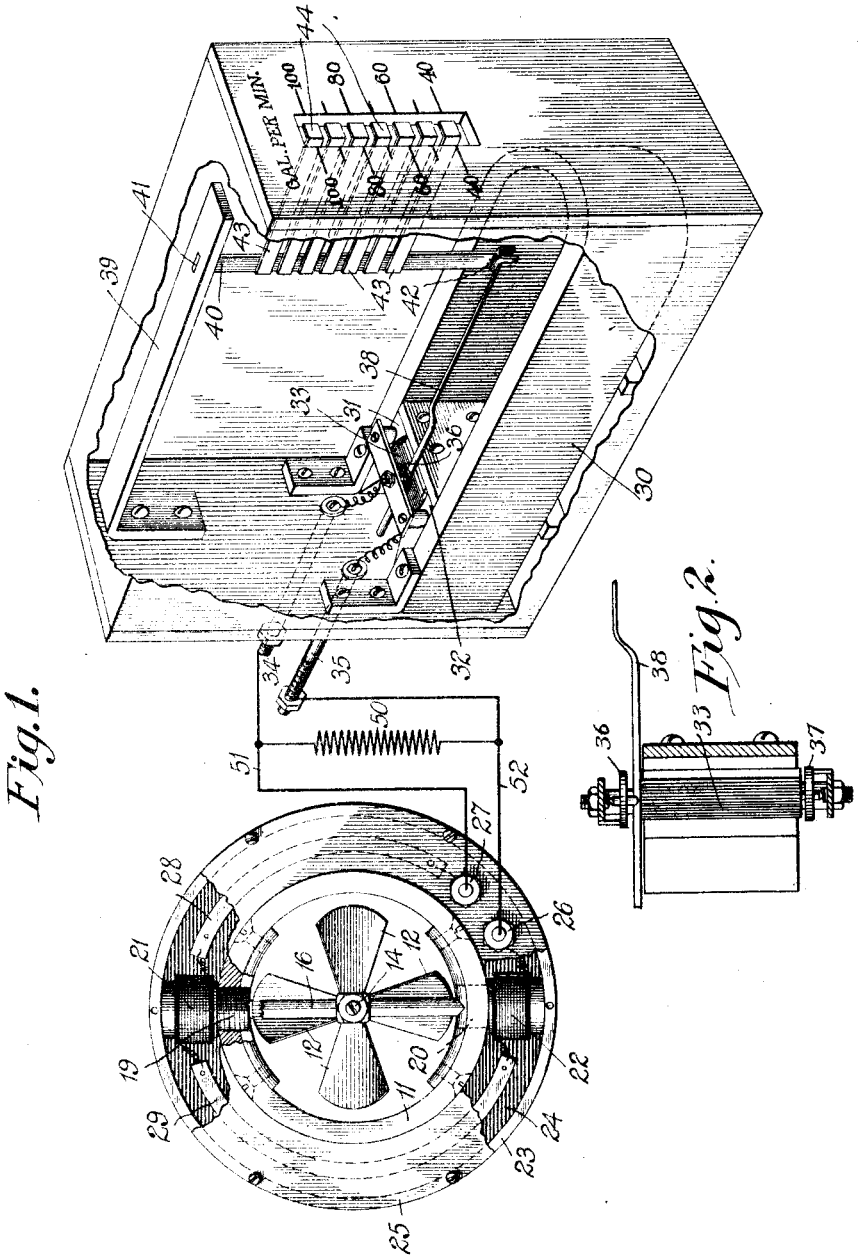
Witnesses:
Leonard W. Novander.
Robert J. Bracke
Inventor
Edmund O. Schweitzer.
By Brown & Williams
Attorneys

UNITED STATES PATENT OFFICE.

EDMUND O. SCHWEITZER, OF CHICAGO, ILLINOIS.

MEASURING INSTRUMENT.

1,087,189.  Specification of Letters Patent.  Patented Feb. 17, 1914.

Application filed February 14, 1912. Serial No. 677,469.

*To all whom it may concern:*

Be it known that I, EDMUND O. SCHWEITZER, a citizen of the United States, residing at Chicago, in the county of Cook and State of Illinois, have invented certain new and useful Improvements in Measuring Instruments, of which the following is a full, clear, concise, and exact description, reference being had to the accompanying drawings, forming a part of this specification.

My invention relates to measuring instruments.

The specific form of the invention, hereinafter to be described in detail, is intended to measure the flow of liquid or gaseous fluid.

The particular objects of this form of the invention are to provide an instrument of great accuracy over a wide range, to provide an instrument which is not subject to derangement, and one also which shall have long life at high efficiency.

In the accompanying drawings illustrating my invention—Figure 1 illustrates in end elevation and in perspective, and partially in diagram, the entire flow-meter; and Fig. 2 is a detail of the galvanometer indicator coil and its mounting.

Like characters of reference apply to similar parts in all of the figures.

As illustrated, the current-generating part of the mechanism comprises a section of pipe 11 in which the set of vanes 12 is rotatably mounted on adjustable pivots, one of which is illustrated at 14, these pivots being supported from suitable cross-arms, one of which is shown at 16. Through the walls of the pipe 11, which is preferably of brass or other non-magnetic metal, I screw the generator pole pieces 19 and 20. Each pole piece is surrounded with a generating coil 21 or 22. Encircling the pipe and magnetically connecting the outer ends of the pole pieces, is an iron ring 23. Hard rubber plates 24 and 25 inclose the generating coils and pole pieces and furnish supports for the binding posts 26 and 27, which are connected with the coils directly and through connector strips 28 and 29 fastened to one of the hard rubber side plates.

When a fluid flows through the pipe 11 it sets the vanes in rotation more or less rapid, depending upon the velocity of the flow. The permanent magnet rotating with the vanes varies the magnetic induction through the coils of the electric generator to set up an alternating current of electricity which can be taken off from the binding posts 26 and 27. The frequency of alternation in the electric current will vary with the velocity of the flow of fluid through the pipe. While it might be possible to make the rate of rotation of the vanes exactly proportional to the rate of flow through the pipe, I have not found it expedient or necessary to resort to this refinement, for the reason that the indicating part of the mechanism may easily be adjusted and calibrated to show the actual rate of fluid flow regardless of whether the frequency of the current generated corresponds exactly to the rate of fluid flow. This will be more fully apparent from a consideration of the indicating part of the mechanism. This part of the mechanism is shown at the right in Fig. 1. It comprises essentially a horse-shoe permanent magnet 30, provided with pole pieces 31 and 32. Rotatably mounted within the embrace of the pole pieces, is a coil 33, the terminals of this coil being connected with the insulated binding screws 34 and 35. The coil is preferably mounted upon jeweled pivot bearings, as indicated in Fig. 2. Two reversely wound spiral springs 36 and 37 serve normally to hold the coil in its intermediate position and act to return the coil to its normal position when deflected therefrom. I have not elaborated the illustration and description of these features of the indicating instrument because they do not differ essentially from those of a well-known galvanometer. Projecting from the coil and moving therewith is a crank arm 38. This arm at its outer end is connected with a set of reeds of different natural vibration rates, as follows: To the frame support 39 a pivoted or a flexible lever 40 is connected at 41. The lower end of this lever is equipped with a stirrup 42 which straddles the end of the crank arm 38. A set of reeds 43, 43 is attached to the lever 40. I have found that these reeds may advantageously be made of spring phosphor bronze. They are filed to different thicknesses or given different weights to give them different natural rates of vibration. It is preferable to put the reed having the highest vibration rate near the fixed end of the lever 40 and the reed having the lowest vibration rate at the swinging end of the lever, the intermediate reeds being graduated from fast to slow. In the drawings, I have shown the ends of the reeds bent at right-angles, as at 44, to form small targets, which aid in displaying the vibration of the associated reeds. The alternating current generated by the rotation of the vane in the pipe 11 flows through the galvanometer coil, causing the crank arm 38 to vibrate at a rate corresponding with the frequency of the current passing through the coil. The vibration of the crank arm puts the spring lever 40 in vibration. The vibration of these parts is, however, very slight indeed, in reality, nothing more than a tremor. When, however, the frequency of the tremor corresponds with the natural vibration rate of any of the reeds, that reed will be set into violent movement. The free ends of the other reeds will be practically quiescent. The ends of the reeds being provided with targets, it is a simple matter to note which of the reeds is in vibration and thus to determine the frequency of the alternating current generated by the rotation of the vane. The number of the reeds and the gradation of their vibration rates will depend upon the conditions under which the instrument is to be operated. In the drawing, I have shown a set of seven reeds, having vibration rates corresponding with the flow of 40, 50, 60, 70, 80, 90, and 100 gallons of liquid per minute. The range could be increased and the gradations between the several reeds could be reduced, if desired. I have found in practice, however, that, when a current is generated having a frequency intermediate between the natural vibration rates of two of the reeds, two reeds will be set in vibration, namely, the one having the next higher vibration rate and also the one having the next lower vibration rate. While the current of intermediate frequency will not act in entire sympathy or harmony with either reed, the relation may still be close enough to establish a pulsating vibration of the two reeds whereby an interpolation will give approximately the true rate of liquid flow in the pipe.

I do not know of any electrical instrument of the prior art which could be connected with the generator of my invention and which could be made to indicate the speed of rotation of the vane. The currents generated are so small that they can scarcely be detected by ordinary electrical instruments. Nevertheless, the principle of sympathetic vibration, which is employed in the indicator of my invention, causes the tremor of the motor part of the galvanometer to be so magnified or multiplied in its visible effects that the frequency of the current and, consequently, the rate of liquid flow are indicated with certainty and precision. While the reeds might be arranged in any order upon the spring lever 40, the smaller amplitude of vibration at the fixed end is more nearly compatible with a high natural rate of vibration, while the larger amplitude at the free end of the lever coöperates best with a reed having a low vibration rate. It is best, therefore, to arrange the reeds in the manner indicated in the drawing.

I have indicated a shunt 50, connected across the terminals of the indicator instrument between the binding posts 51 and 52. This shunt is not ordinarily used in connection with the generator herein shown and described, but the indicating part of my invention may be connected with other sources of alternating current, in which case the shunt may be used, as is the custom with millivolt meters.

While I have described a preferred form of my invention, it will be apparent to those skilled in the art that modifications may be made without departing from the spirit of my invention.

What I claim as new and desire to secure by Letters Patent is:

1. In a device of the class described, the combination of an electromagnetic oscillatory motor mechanism, a flexible lever fixed at one end and having its free end mechanically connected with a movable element of the oscillatory motor mechanism, and a plurality of tuned reeds of graduated natural vibration rates, all of said reeds being attached to said lever, the reeds of higher vibration rates being attached to the lever at greater distances from the free end of the lever than the reeds of lower natural vibration rates.

2. In combination, a permanent magnet, a current carrying coil rotatably mounted within the magnetic field of said permanent magnet, means for conveying current to and from said coil, spring mechanism tending to return said coil to its normal position when rotated therefrom, a crank arm extending from said coil and rotatable therewith, a flexible lever fixed at one end and mechanically connected at the other end with said crank arm, and a plurality of reeds of different vibration rates attached to said flexible lever, the reed of highest vibration rate being attached to the flexible lever nearest the fixed end of the flexible lever and the reeds of lower vibration rate being attached to the flexible lever in order toward the free end of the flexible lever.

3. A frequency meter comprising a galvanometer structure, a plurality of tuned reeds of graduated natural vibration rates, a vibratory member to which all of said reeds are attached, and means connecting said vibratory member with a movable element of the galvanometer structure, the reeds of lower natural vibration rates being attached to the vibratory member at greater distances from the axis of vibration of said member than the reeds of higher natural vibration rates.

In witness whereof, I hereunto subscribe my name this 12th day of February, A. D., 1912.

EDMUND O. SCHWEITZER.

Witnesses:
W. A. BLIND,
E. W. STEEGE.